US010924491B2

(12) United States Patent
Mohandoss et al.

(10) Patent No.: US 10,924,491 B2
(45) Date of Patent: Feb. 16, 2021

(54) PROCESS MANAGER FOR DIGITAL COMMUNICATION

(71) Applicant: SAP SE, Walldorf (DE)

(72) Inventors: Vijayalakshmi Mohandoss, Bangalore (IN); Simon Tacke, St. Leon-Rot (DE); Soumya Ranjan Das, Cuttack (IN); Karthik Thiru, Bengaluru (IN); Aalbert Niet, Bammental (DE)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 16/139,518

(22) Filed: Sep. 24, 2018

(65) Prior Publication Data

US 2020/0099690 A1    Mar. 26, 2020

(51) Int. Cl.
*H04L 29/06* (2006.01)
*G06F 21/51* (2013.01)
*G06F 21/60* (2013.01)

(52) U.S. Cl.
CPC ............ *H04L 63/102* (2013.01); *G06F 21/51* (2013.01); *G06F 21/604* (2013.01); *H04L 63/0263* (2013.01); *H04L 63/04* (2013.01); *H04L 63/20* (2013.01)

(58) Field of Classification Search
CPC ... H04L 63/102; H04L 63/20; H04L 63/0263; H04L 63/04; G06F 15/16
See application file for complete search history.

(56) References Cited

U.S. PATENT DOCUMENTS

| 7,697,942 B2 * | 4/2010 | Stevens ................. G06F 21/43 370/328 |
| 2002/0143766 A1 * | 10/2002 | Rajasekaran ....... G06F 21/6218 |
| 2008/0301261 A1 * | 12/2008 | Nakazawa .............. G06F 16/93 709/219 |
| 2009/0204644 A1 * | 8/2009 | Kodimer ............... G06F 3/1222 |
| 2017/0039175 A1 | 2/2017 | Hostiuc et al. |
| 2017/0131917 A1 * | 5/2017 | Yun ..................... G06F 12/0246 |

\* cited by examiner

*Primary Examiner* — Ali S Abyaneh
(74) *Attorney, Agent, or Firm* — Buckley, Maschoff & Talwalkar LLC

(57) ABSTRACT

Provided is a method and system for managing communication processes across multiple jurisdictions through a single service. In one example, the method may include receiving a communication request from a sending device, the communication request comprising a process identifier and an action identifier, identifying a communication process based on the process identifier and an action of the communication process based on the action identifier, identifying one or more currently available actions of the communication process based on status information associated with the sending device, dynamically determining whether the identified action is allowed based on the one or more currently available actions, and in response to determining the action is allowed, transmitting the received communication request to a receiving device.

20 Claims, 8 Drawing Sheets

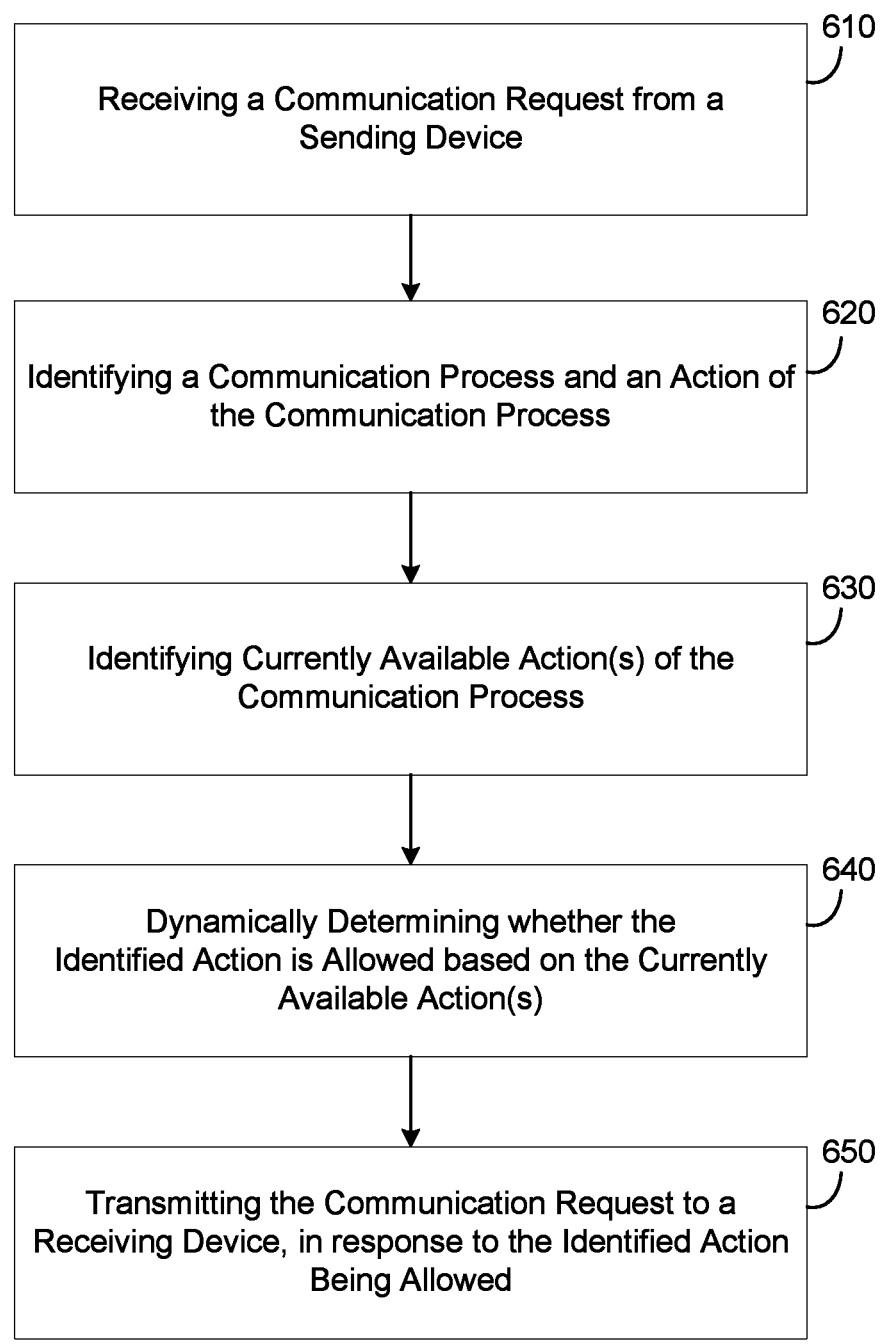

PROCESS MANAGER FOR DIGITAL COMMUNICATION

BACKGROUND

Electronic documents (i.e., eDocuments) provide organizations with the ability to generate, maintain, and submit business-related correspondence such as tax forms, invoices, purchase requests, orders, and the like. For example, eDocuments are often used for business-to-business (B2B) and business-to-government (B2G) communications. There is no single communication sequence for submitting an electronic document. Rather, each distinct document process involves its own unique sequence of steps. Furthermore, each country (or jurisdiction) often requires its own technical requirements for the process which can vary significantly from country-to-country. Accordingly, the amount of time and effort involved in complying with document submissions has increased significantly.

Traditional eDocument services are designed on a per-country basis. In other words, the steps of a document generation and exchange process are hard-coded within the software and are not capable of access or modification. This can be beneficial because it ensures that the document generation and submission process is followed correctly. However, when an organization conducts business globally or in multiple countries, they must use separate software for each jurisdiction. This can be time consuming and can also be difficult to keep up-to-date given that jurisdictional processes are always evolving. Accordingly, what is needed is a more flexible compliance service.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 6 is a diagram illustrating a method for determining whether a communication request is allowed in accordance with an example embodiment.

Figure 1:
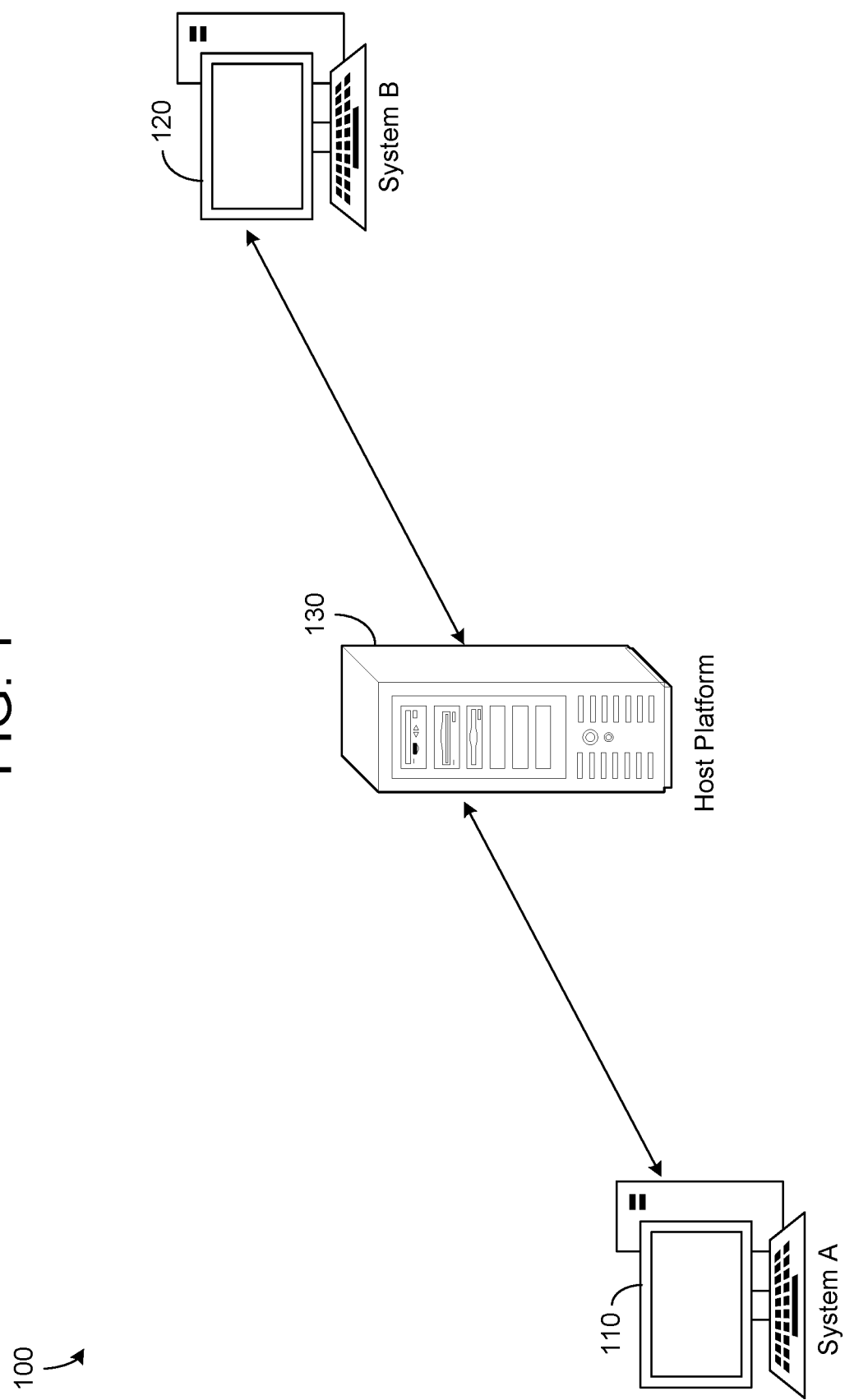
FIG. 1 is a diagram illustrating a cloud computing environment for processing communication sequences in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Traditional compliance software is dedicated to ensuring an electronic document satisfies rules and regulations of a single jurisdiction. In other words, when generating electronic documents on behalf of a sender/receiver, the traditional digital compliance software ensures that the document complies with the regulations and technical requirements of a single jurisdiction. This limitation is in part because compliance information, regulations, technical requirements, and/or the like, are often hard-coded into the compliance software by the developer. As a result, there is no unified experience for a multi-country (multi-jurisdiction) legal or other compliance-based service application. This can be difficult when an organization has business dealings in multiple countries. In this case, the organization must use different versions of compliance software for each respective country.

The example embodiments overcome these drawbacks by implementing a process manager which can ensure that an electronic document complies with the regulations and technical requirements in different jurisdictions. The process manager is loosely coupled from the regulations and requirements of the jurisdiction instead of the regulations and requirements being hard-coded into the software. For each document submission (such as a legal document), the entities involved in each jurisdiction may be different, the steps involved may be different, the documents that are to be submitted may be different, and the like. The framework of the process manager can maintain all of the steps involved in a B2B or B2G, which can be used to identify which steps are allowed and maintain the status (i.e., next step) of the process for a sender. The process manager service may be implemented behind the scenes and my not directly interact with a user. Instead, the user may access an application which implements the process manger from a cloud service. A one-time configuration may be performed by the application (and country) where it is being used to configure the jurisdictional compliance requirements.

The digital compliance service may be hosted within a cloud platform provides a unified experience for B2G (business to government) and B2B (business to business) communications across different countries through the use of reusable software components which require minimal customizations. The platform may include an orchestration framework to manage the configurations of different B2B and B2G processes. Hardcoding the steps involved in the process within the code will lead to code maintainability issues and also strict limitations on jurisdiction. Instead, the process manger described herein may dynamically manage the process steps, statuses, entry criteria, and the like, for each country-specific implementation based on identifiers and status information.

In the examples herein, a process includes a sequence of steps involved with a communication such as submission of an electronic document. Furthermore, an action identifies a step within the sequence of steps. Each process may include a plurality of actions that must be performed in a particular order. The types of actions may include data transmissions, receipt of data, acknowledgments, notifications, queries, exchanges of information, and the like. For business to government submissions, the communication process may include an action of formally submitting the electronic document (e.g., tax document, property document, etc.) to a government entity. For business to business submissions, the electronic document may include an invoice, bill of materials, sales and distributions, orders, and the like. Each document submission process may have different versions enabling actions to be customized based on particular rules and regulations. The underlying code which is used to implement the process manager may be designed in such a way that it is reusable across different software products and not hard-coded within the application. For example, the process manager may be developed in Java and packaged as a jar file so that it can be consumed by different applications deployed in a cloud environment or other host environment. The process manager may be a software as a service (SaaS).

The process manager may be implemented by a host server through which both the sender and the receiver communicate. Each of the sender and the receiver may have application software that is installed therein for communicating with the process manager. Also, the process manager may maintain a sequence of actions for different document submissions across different jurisdictions. The application software may be configured for a particular jurisdiction. When a request is received from the sender, the process manager may identify the process associated with the request based on a process identifier within the request. Furthermore, the process manager may identify an action attempting to be made by the communication request based on an action identifier included in the request. The process manager may determine whether such action is allowed in view of a current status of the process for the sender which may be stored in a status database. If allowed, the process manager may forward the communication to the receiver. If not allowed, the process manager may notify the sender.

The process manager takes some design inputs from the process manager in an eDocument framework. The process manager is built in a way so that it can be reused across multiple products/application and not only specific to B2B and B2G applications. Furthermore, the process manager may be completely developed in Java and packaged as a jar so that it can be consumed by any application deployed in a cloud platform. The process manager may perform multiple functions which can include execution of the process step in a streamlined manner while confirming the steps. The steps and resulting status are configurable and not part of the coding. Rather, the process manager may use identifiers within the communications between the sender/receiver and the process manager. Also, the process manger may maintain or otherwise interact with another program that keeps status information of a communication process.

In comparison to a traditional eDocument software, the process manger may be implemented within a cloud platform, may require less coding to maintain, may have a simpler structure, may track changes in status without coding, and may provide a better overview of the statuses. The process manager may check if a process step or action is allowed based on configuration data that is implemented through status flags, action IDs, process IDs, sender IDs, and the like. Furthermore, the process manager may determine a new (updated) status of the process based on the execution of a process step and modify the status flags to reflect the update. The process manger may also determine possible subsequent steps based on the current status. The process manager may also determine the next possible action based on the current process status. In contrast, a related on-premise eDocument software has no scope of extensibility because it is tightly coupled to the eDocument framework.

FIG. 1 illustrates a cloud computing environment 100 for processing communication sequences in accordance with an example embodiment. Referring to the example of FIG. 1, communication systems 110 and 120 communicate with one another via a host platform 130. For example, the host platform 130 may host an application, a service, a software program, or the like, which facilitates communication between the communications systems 110 and 120. In some embodiments, the host platform 130 is a cloud computing platform that hosts a process manager as described herein. The communication systems 110 and 120 may be computing device such as desktop computers, laptops, mobile phones, smart wearables, servers, databases, and the like. The communication systems 110 and 120 may be connected to the host platform 130 via a network such as the Internet, a private network, and the like. In some embodiments, the host platform 130 may manage document-based communications between the communication systems 110 and 120. Here, the communication systems 110 and 120 may represent systems performing a business-to-government communication or a business-to-business communication.

According to various embodiments, system A 110 may transmit a request such as a document-based communication or the like, to system B 120 via the host platform 130. The system A 110 may include an application which has been developed such that it can access and re-use the process manager software stored by the host platform 120. In response to receiving the request from system A 110, the host platform 130 may determine whether the request is allowed based on a type of communication process being performed and which step of the communication process the request is associated with. For example, the host platform 130 may determine a communication process from among a plurality of types of communication processes for a jurisdiction based on a process identifier included in the request. Furthermore, the request may also include an action identifier which identifies the step of the communication process associated with the request. In response, the host platform may identify the communication process and the steps involved, and identify which step is being attempted by the request from system A 110.

Based on the process and the action, the host platform 130 may further determine whether such action is allowed based on a current status of the communication process between the systems 110 and 120. For example, the process manager on the host platform 130 may determine whether the action is allowed based on a current status of the communication process being performed between the communication system 110 and 120 which are identified from status flags stored in a configuration database. Here, the process manager may determine a current status of the communication process based on a sender identifier included in the communication request, and a plurality of status flags associated with the steps of the communication process associated with the sender identifier. The status flags may be stored within a storage of the process manager or some other service or application (e.g., monitoring service, etc.) in communication with and accessible to the process manager of the host platform 130 such as a monitoring application.

In this example, each sequential step of the communication process may have its own status flag associated therewith. The steps that are currently available may be indicated as so by the respective status flags. Likewise, the steps that are not available may also be indicated by the respective status flag. Here, the status flag may have any of multiple values such as available, not available, needs updating, or the like. Based on the availability of the action identified from the request, and the current status of the communication process, the host platform 130 may determine whether to allow the communication between the communication systems 110 and 120. When the request is allowed, the host platform (or other service) may update the current status of the communication process between the communication systems 110 and 120 which are associated with the sender ID. The communication process may continue until the document or other action has been generated, executed, finalized, submitted, and/or the like.

Figure 2:
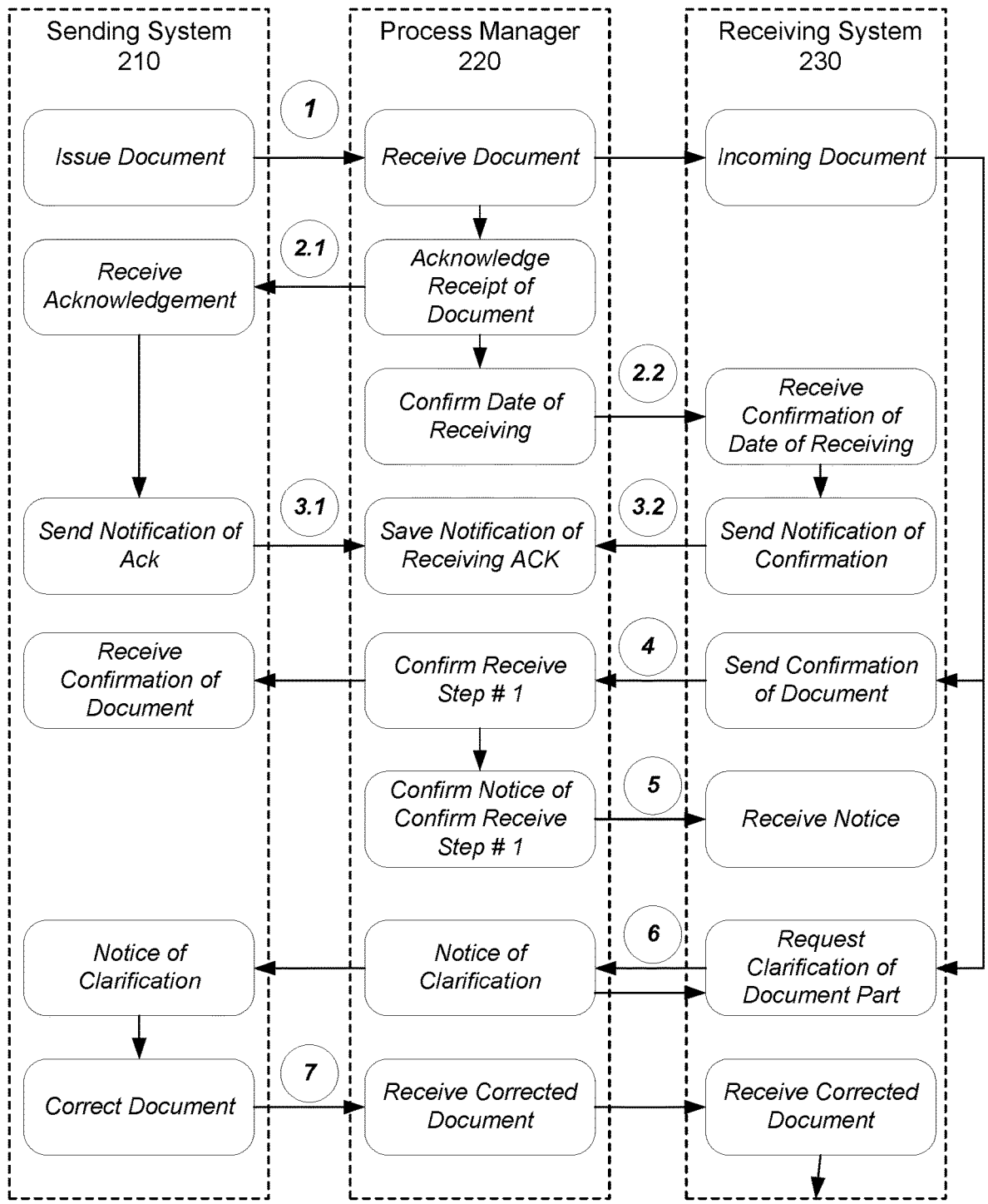
FIG. 2 is a diagram illustrating an example of a document communication process in accordance with an example embodiment.

FIG. 2 illustrates an example of a document communication process 200 in accordance with an example embodiment. Referring to FIG. 2, the communication process 200 is between a sending device 210 and a receiving device 230, via a process manager 220. For example, the process manager 220 may be implemented on a host platform that is connected to the sending device 210 and the receiving device 230 via a network. In this example, the communication process 200 includes a plurality of sequential actions (e.g., steps 1-7, etc.) which must be adhered to satisfy compliance requirements of a particular jurisdiction when submitting a document. An identification of the steps, the order of the steps, and the like, may be maintained by the process manager 220. Each time a communication (or step) is received from either the sender 210 or the receiver 230, the process manager 220 may dynamically determine whether the communication is allowed. When an action is allowed, the process manager 220 may ensure the action is performed and update a current status of the process between the sender 210 and the receiver 230 in a status database or other storage. When an action is not allowed, the process manager 220 may notify the sender 210 and/or the receiver 230 that such action is not allowed.

In some cases, multiple steps may be available. For example, after step 1 is performed, both steps 2.1 and 2.2 are available. The interconnection of steps may be different for each type of jurisdiction/country. The process manager 220 may be configured for a particular jurisdiction based on an initial setting of the application used by the sender 210 or the receiver 230. Accordingly, the process manager 220 may be consumed by software on the sending device 210 and the receive device 230. The process manager may keep a storage of different document submission processes for a particular jurisdiction. Each time the sender 210 and the receiver 230 submit a communication to the process manager 220, the communication may have a header which identifies a process (via a process ID) and an action associated with the process (via an action ID). This way, the process manager 220 knows which process and which step of the process the communication is associated with. Furthermore, the process manager 220 may also receive an identifier of the sender and/or the receiver. The process manager 220 may use the sender identifier to determine a current status of the process being performed. Here, the process manager 220 may compare the step of the process associated with the communication with the current status of the process, to determine if the communication request is allowed.

Figure 3:
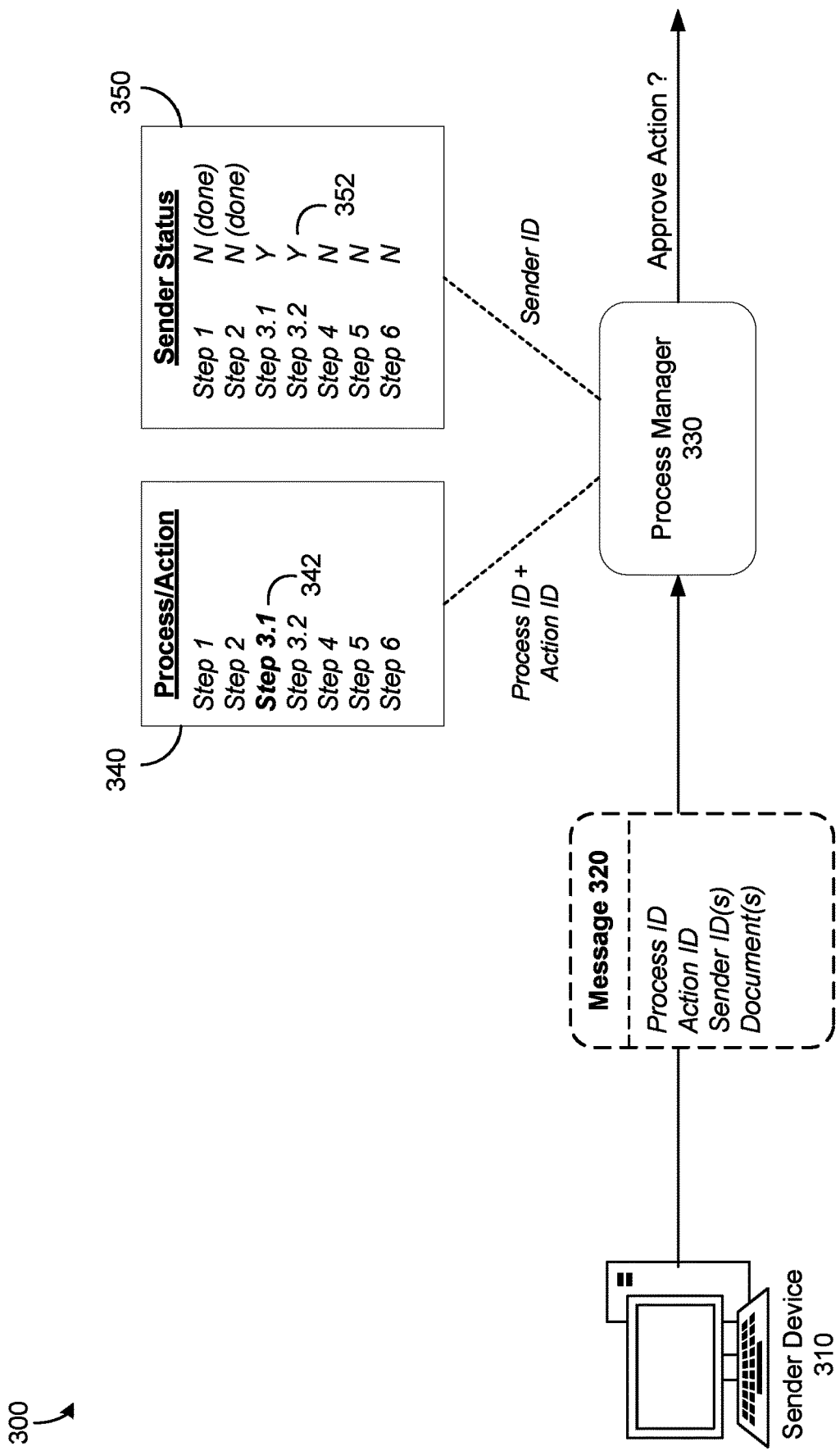
FIG. 3 is a diagram illustrating a process manager interacting with process status information in accordance with example embodiment.

FIG. 3 illustrates a process 300 of a process manager 330 interacting with process status information in accordance with example embodiment. In this example, the process manager 330 receives a message 320 from a sender device 310 requesting that an action be performed. Here, the action may be the submission of a document. Within the message 320 may be a header or other metadata that identifies a process associated with the requested communication, and an action or step of the process. The process ID may be used by the process manager 330 to identify a communication sequence which includes a plurality of steps while the action ID may be used to identify a particular step from the communication sequence. The process steps may be varied and thus may include multiple versions. For example, a process may include a plurality of steps which are marked with status flags making it possible to alter which steps are associated with which process version based on which status flags are marked as on or off.

In this example, the process manager 330 determines that the process has steps 1-6 based on the process ID within the message 320, and that step 3.1 is being performed by the message 320 based on the action ID. Here, the identified step 3.1 is marked with reference numeral 342. The process ID may be mapped to an underlying process from among multiple possible processes. Meanwhile, the action ID may be used to identify which step from the process is being performed. Here, the message 320 is associated with step 3.1 identified by reference numeral 342.

Furthermore, the process manager 330 may determine a current status of a communication process being performed by the sender 310 in communication with another device (e.g., B2B or B2G) based on the sender ID. Here, the sender ID may be used to identify a current status of the process from a sender status table 350 which identifies a current status of the communication process. In this case, steps 1 and 2 have been marked as complete and steps 3.1 and 3.2 have been marked as available to be performed. In the example of FIG. 3, the action 342 identified from the table 340 based on the process ID and the action ID matches a currently available step 352 of the current status of the sender. Therefore, the process manager 330 may perform the communication by forwarding the communication to a receiving device (not shown).

The process manager may be written in Java and may be deployed either as an independent service in a cloud platform or can be embedded as a jar in any application being deployed in a cloud platform. This makes the process manager highly reusable. Because the process manager is generic, it can be offered as a service in the cloud so that it can be used across multiple products for process orchestration. The process manager maintains detailed information on all the steps required for an action in a single call so that the number of calls to an application programming interface (API) of the process manager is reduced. The process manager provides the flexibility to configure the sequence in which the process steps are to be performed so that independent steps can be performed in parallel.

In some embodiments, the process manager has the flexibility to configure an Iflow (Integration flow) to be called for a process step, a java method or even an external API which supports additional use-cases when compared to a related on-premise process manager. The process manager described herein also provides information on a queue name for queuing of the requests while control is passed from one Iflow to another. It also provides information on if a status update to the user is required for a process step.

The process manager may be exposed as a REST API so that the process manager can be called from Iflows deployed in the SAP Cloud Integration. This extends the scope of usage of the process manager for different platforms. The process manager may provides response in a standard JSON format so consuming it in any application is easier and can be easily converted into XML if required for using in Iflows. Because it is delivered as a jar, in-process calls within the java app is possible for applications using the jar, which will improve the performance significantly in comparison to a REST API call. The process manager also provides an interface which can be implemented in the applications using process manager to do any extensions if required.

The process manager may be called through an API request or message (such as message 320 shown in FIG. 3). For example, the API endpoint may be /api/v1/int/callProcessManager. Within the API request may be a header which includes various identifiers. The identifier may include, but are not limited to, an action ID which specifies the action to be performed on s document (e.g., create, submit, acknowledge, etc.), a process ID which may identify a process and may include a combination of process name and process version, an organization ID which is the organization ID of the customer, a partner ID which is a partner ID of the customer as defined in a partner directory, a document type ID which identifies a type of document as defined in the system, a document ID which is a unique identifier for the document which is usually the source document ID, and the like.

Organization ID, partner ID, document ID, and document type ID may help the process manager to determine the current status of a document. These details may be passed in the request header and a default implementation may be written to fetch the status of the document from the logging tables (status DB, etc.). However, this implementation can be changed by the applications using process manager to fetch the status of the document from some other source as well based on the details provided in the request header. Action ID and process ID may be used to get the process step details and status details for a particular process and action based on the configuration maintained in process manager tables. Meanwhile, one or more of organization ID, partner ID, document ID and document type may be used to get the status of the document. This status may then be used to determine if an action is allowed by checking against the process manager table (Process Check Status Flag). In some cases, a Process Status Flag table holds the different possible status of a communication and the Process Status Flag Position table holds the position of each of the flags.

Figure 4:
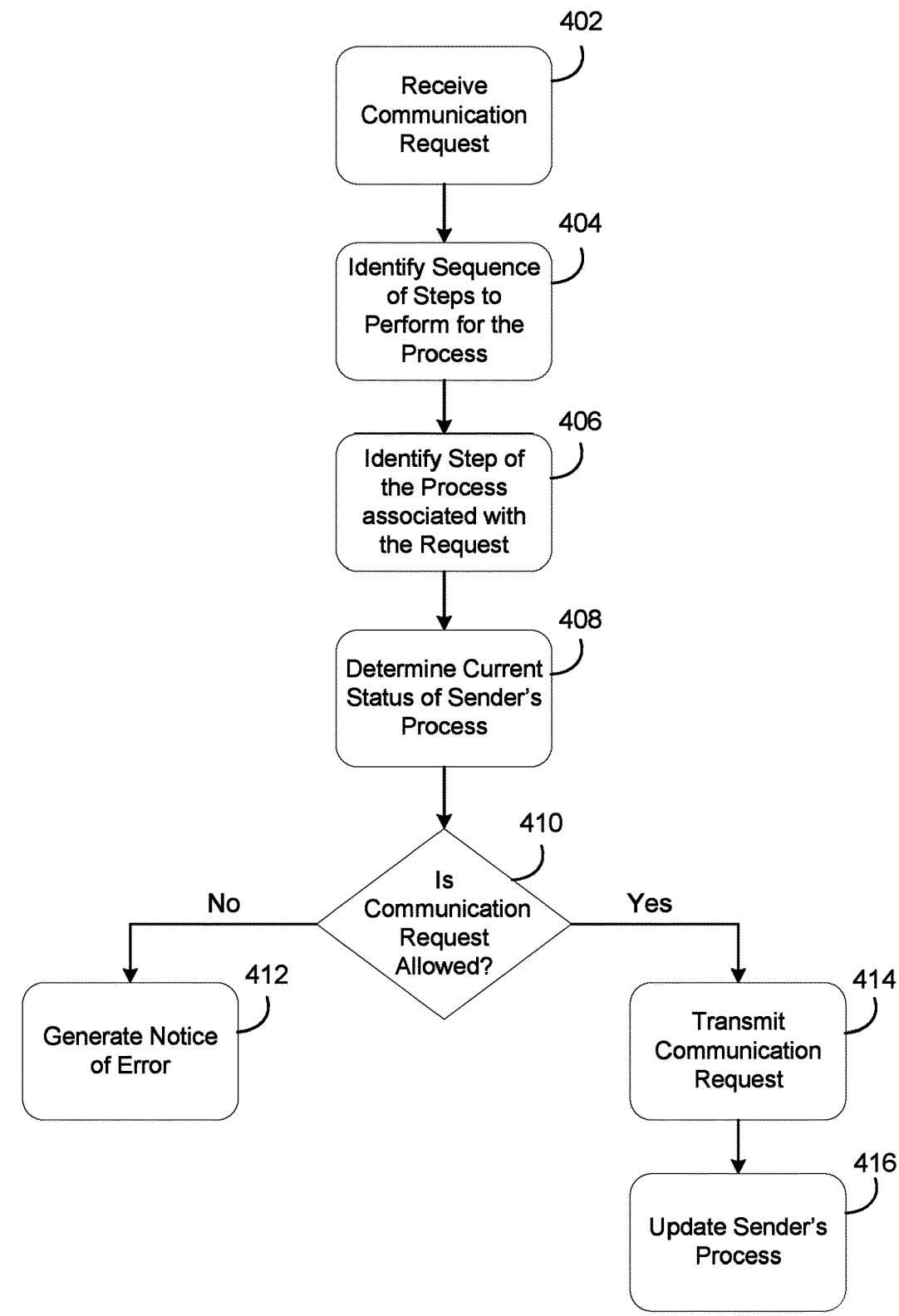
FIG. 4 is a diagram illustrating a process of determining whether a communication request is allowed in accordance with an example embodiment.

FIG. 4 illustrates a process 400 of determining whether a communication request is allowed in accordance with an example embodiment. For example, the process 400 may be performed by a process manager or other cloud service. Referring to FIG. 4, in 402, the process manager receives a communication request from a sender. The communication request may be an API request or other message submitted. The request may include a process ID identifying a communication process (e.g., B2B, B2G, etc.) and an action ID identifying a step within the process. In 404, the process manager may determine the process being performed based on the process ID. Likewise, in 406, the process manager may determine which step of the process is being performed based on the action ID.

In 408, the process manager may determine a current status of the sender's communication process based on a status database which stores a current status of the sender. The current status may be determined based on a sender ID included in the request which is received and compared to the status database to identify a current position of the communication sequence. The status may identify which steps the sender has performed and not performed. Therefore, it can easily be ascertained by the process manager which steps are the next steps to be performed.

In 410, the process manager determined whether the request received in 402 is allowed. Here, the process manager may determine if the action/step identified based on the process ID and the action ID is allowed based on the current status of the sender identified based on the sender ID from the status database. For example, if the action/step identified matches a next step to be performed for the sender, the communication is allowed. In 412, if the communication request is not allowed, the process manager notifies the sender that the communication is an error. If the communication request is allowed, in 414 the process manager forward the communication to a receiver and updates the status, in 416.

Figure 5A:
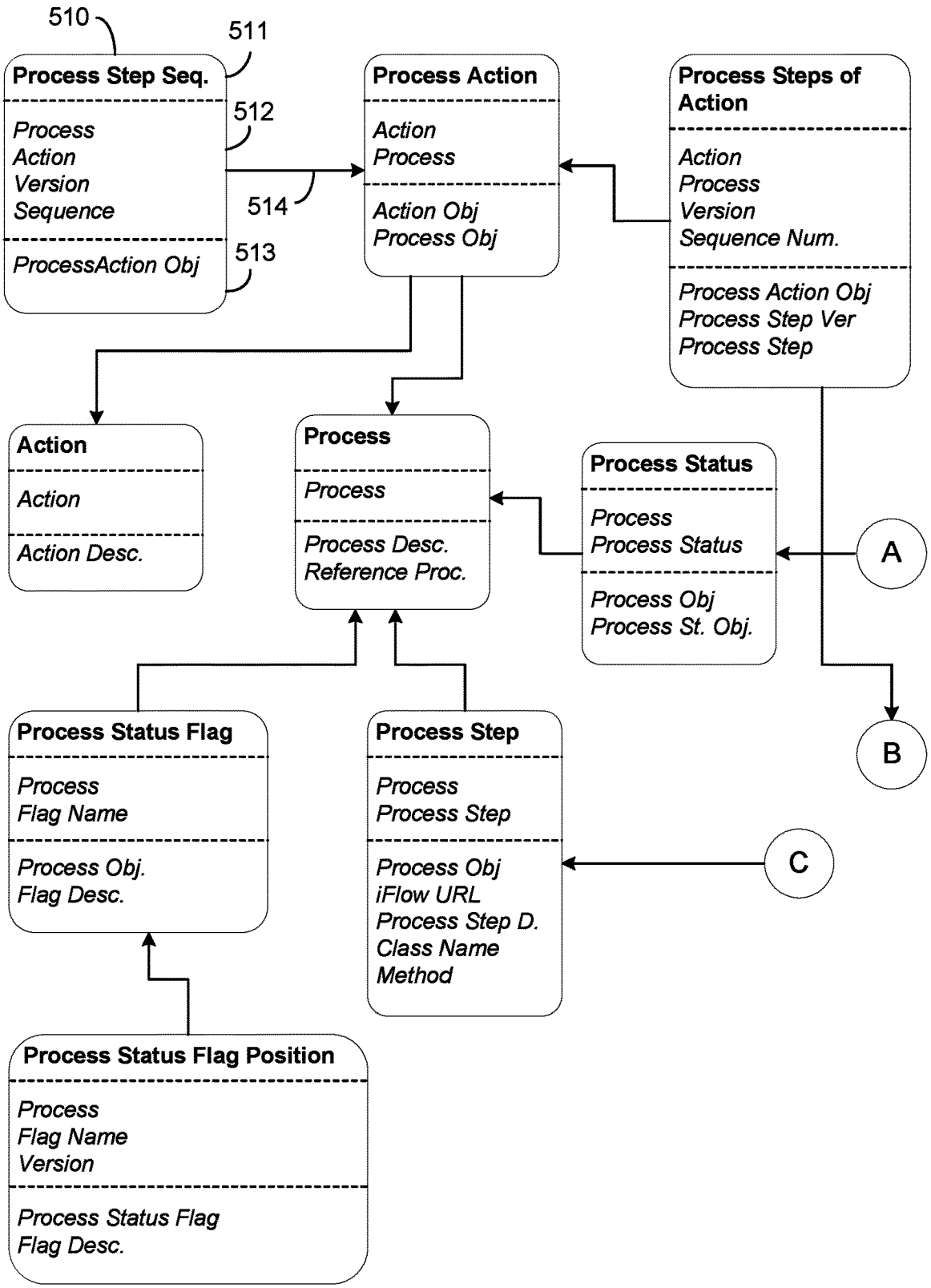
FIGS. 5A-5B are diagrams illustrating a database managed by the process manager in accordance with an example embodiment.
Figure 5B:
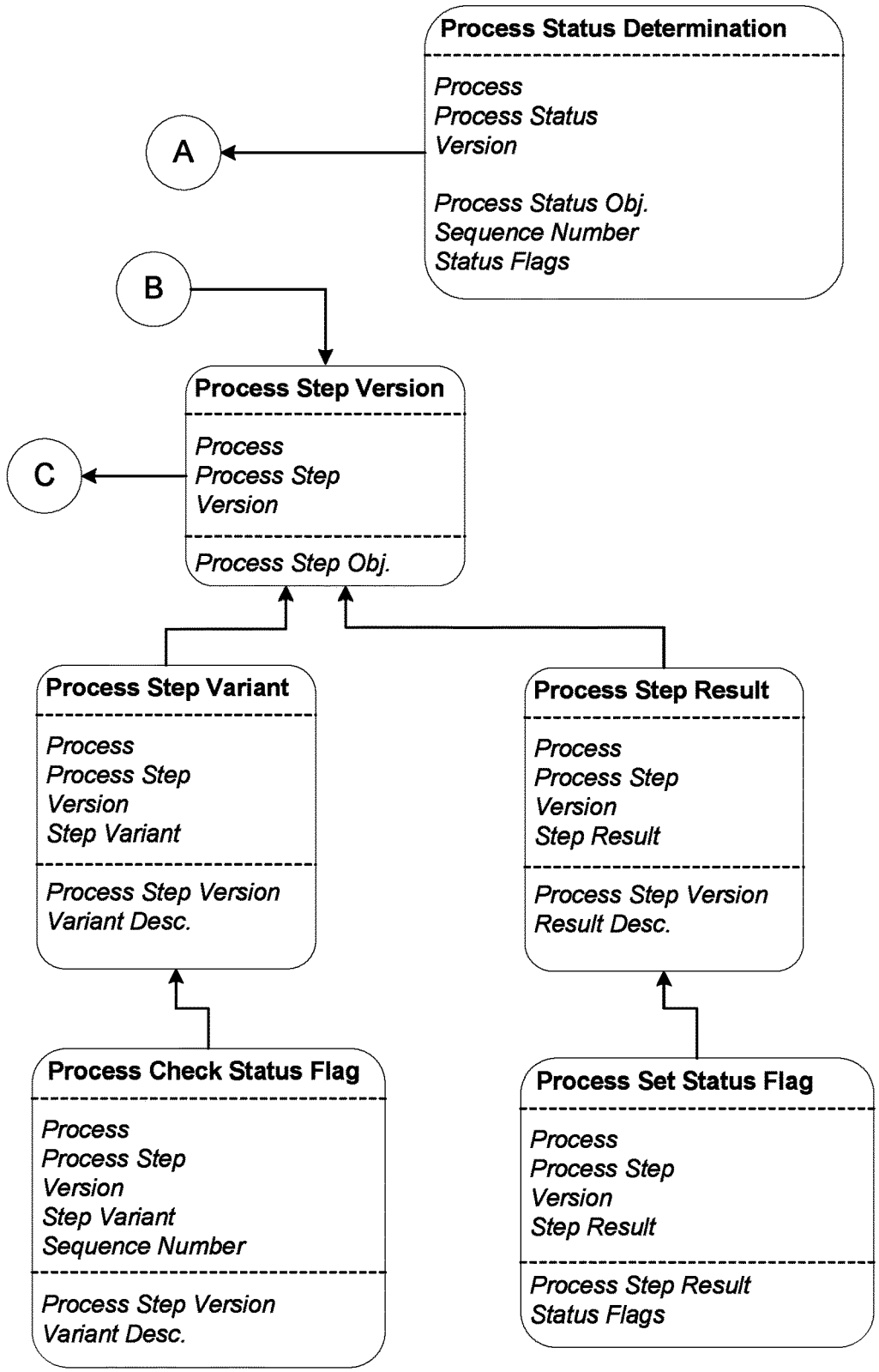

FIGS. 5A-5B illustrates a database 500A-500B managed by the process manager in accordance with an example embodiment. The database 500A-500B may be used to determine an action or a step associated with an API request message received from the sender or receiver. Referring to FIGS. 5A and 5B, the database includes a plurality of storage nodes 510 including an identifier of the storage node 511, other nodes associated with the node 512, and attributes 513. The nodes 510 are connected via links 514 which identify a relationships between the data therein. The database portions 500A and 500B are connected to one another but are spread across multiple sheets for clarity.

In this example, an action maps to process steps that are to be performed for a process. The process manager can convert a global action into a list of process steps pertaining a process. A process version has assigned to it a list of process steps that are valid for that process version, and an ordered list of status flags that may be set in that process version. The existence of process versions allows changing the behavior (the valid steps, and the valid status flags) of a process over time. It allows variations of an existing process which could be caused, for example, by a legal change. A process may include one or more process steps. A process step represents a transition from one process status to another. A process step can be configured to call an Iflow, java method or even an external API. In addition, the process step may also provide information on the queue name so that after each step execution, the request is passed to the corresponding queue. It also provides information on if a status update to user is required for a process step.

A process step can have a process step variant which allows a variation of the logic in a process step or to control different results of the same process step. A process step can have multiple process step results which allow branches in the process flow. A process with a single process step result is a linear process. The process status flags capture the status of the process. The definition and position of the status flags is freely configurable per process. The process status of a document inside a process is derived from the combination of process status flags. The process step sequences capture the sequence in which the process steps are to be executed so that the process manager can execute independent steps in parallel.

Meanwhile, a process holds details on the processes for which configuration is available in the process manager. An action holds the list of possible actions that are allowed for different processes. A process action holds the mapping of actions that are allowed for each process. A process step holds details on the process steps for each process, corresponding Iflow name or class and method along with the queue name. A process step version holds mapping of the process steps to be performed for each process in a version. A process step variant holds details on the variants available for a process and process step combination for a version. If there are no variants, this table looks same as the process step version. A process step result holds details on the results that are possible for a process and process step combination for a version.

A process status flag holds details on the status flags that are available for a process. A process status flag position holds the position number of the flag defined in the process status flag table. The process status holds details on the statuses of the documents being processed. The process status determination holds the unique status for the combination of status flags which determines the status of the document. A process check status flag holds the status flags for entry condition of a process step. Based on this status flag the process manager determines if a process step is allowed or not. A process set status flag holds the status flag to be set based on the result of the process step. The flag should be set or reset in the corresponding flag position based on this configuration. A process steps for action holds the mapping of the process steps to an action in the process in a sequence. A process step sequence holds the sequence in which the process steps in an action should be performed.

FIG. 6 illustrates a method 600 for determining whether a communication request is allowed in accordance with an example embodiment. As an example, the method 600 may be performed by a process manager software hosted by a cloud platform or other host platform (e.g., web server, etc.) As another example, the method 600 may be performed by another type of device such as computing system, a server, a database, or a combination of devices such as multiple nodes of a database, a cloud platform, and the like. Referring to FIG. 6, in 610, the method may include receiving a communication request from a sending device. For example, the communication request may include a document being transmitted or requested for transmission from a sender to a receiver. As another example, the request may include another type of communication such as a message, a notification, an acknowledgment, and the like. The communication request may include various identifiers such as a process identifier which identifies the communication process associated with the transmission, and an action identifier which identifies a step or steps from the process which the current action is associated with, a sender identifier such as an organization ID, a document ID, a family ID, and the like. The sender identifiers may be used to identify a sending device, a software application, a document, and/or the like, associated with the process.

In 620, the method may include identifying a communication process based on the process identifier and an action of the communication process based on the action identifier. Here, the communication process may include a plurality of sequential submission steps or actions between a sender and a receiver, via an intermediate platform which includes the process manager. For example, the sequence of actions may be associated with a document being sent from the sending device to the receiving device, via a process manager, where the sequence of actions can by modified by the sending device and/or the receiving device via the process manager. In other words, the sequential steps are configurable and can be adjusted based on the jurisdiction associated with the communication process. In some embodiments, the process may be identified based on the process identifier which includes one or more of a process name and a process version which are included in a header of the communication request received from the sending device. Different versions of the same process may be configured for a jurisdiction. Therefore, the process manager may consider multiple routes for the process which may be updated over time. Meanwhile, the action identifier may identify which step or steps within the communication process the current request is associated with.

In 630, the method may include identifying one or more currently available actions of the communication process based on sender information which is stored in a configuration table or other data structure. Here, the process manager may be used to identify a current status of the sender's communication process based on status information detected by a monitoring application that is executing on the cloud platform. The sender may be identified based on a sender ID which is included in the communication request such as an organization ID, a document ID, a device ID, an application ID, and the like. Based on the sender identification information, the process manager may retrieve a current stats of the sender's communication process from a storage.

In other words, the process manager can determine which step or steps are allowed to occur next within the process identified by the process ID based on sender information stored in a configuration storage. In some embodiments, the one or more currently available actions may be identified based on status flags which are assigned to the steps of the communication process and stored in a configuration table or other storage. The status flags may be configurable by the process manager. The status flags may be dynamically updated each time a new communication request is processed and submitted/transmitted to reflect that the step has been completed and to move the status to the next step or steps.

In 640, the method may include dynamically determining whether the identified action is allowed with respect to the communication process based on the one or more currently available actions of the current status of the sender. Here, the process manager may determine whether the action identified from the action ID is available for the sender based on the current status of the sender's communication process which is stored in a configuration database. In some cases, the one or more steps of the process that are available may be detected based on status flags of the process. In this case, the steps that are allowed and the allowability may be indicated by the status flag associated therewith which is stored in a configuration table or other storage structure. Likewise, the steps which are not allowed may be stored in the configuration table. The communication request may have a document ID, an organization ID, or the like, which identifies the sender. The status of the sender's communication process may be stored within the process manager or accessed from a storage which the process manager communicates with based on the sender identifier. Therefore, the process manager may determine whether the communication request is the next step in the communication process. Furthermore, in response to determining the received communication request is allowed, in 650 the method may include transmitting the received communication request to a receiving device.

In some embodiments, the method may further include, in response to determining that the received communication request is not allowed, outputting a notification to the sending device indicating the communication request is not allowed. Here, the process manager may determine that the action identified from the action ID is not allowed based on a current status of the sender's communication process. In some embodiments, the communication request may include an electronic document to be transmitted to the receiving device, and the determining comprises determining whether the current status of the communication process allows transmission of the electronic document.

Figure 7:
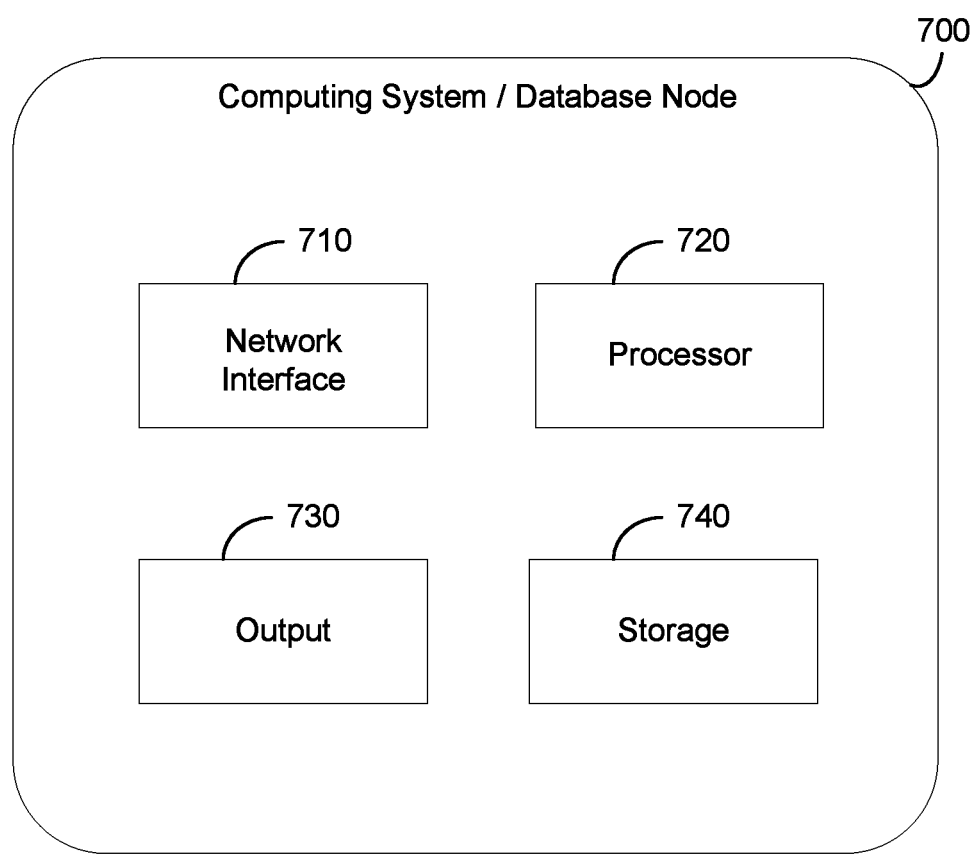
FIG. 7 is a diagram illustrating a computing system in accordance with an example embodiment.

FIG. 7 illustrates a computing system 700, in accordance with an example embodiment. For example, the computing system 700 may be a database node, a server, a cloud platform, a user device, or the like. In some embodiments, the computing system 700 may be distributed across multiple devices. Referring to FIG. 7, the computing system 700 includes a network interface 710, a processor 720, an output 730, and a storage device 740 such as an in-memory. Although not shown in FIG. 7, the computing system 700 may also include or be electronically connected to other components such as a display, an input unit, a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The output 730 may output data to an embedded display of the computing system 1000, an externally connected display, a display connected to the cloud, another device, and the like. For example, the output 730 may include a port, an interface, a cable, a wire, a board, and/or the like, with input/output capabilities. The network interface 710, the output 730, or a combination thereof, may interact with applications executing on other devices.

The storage device 740 is not limited to a particular storage device and may include any known memory device such as RAM, ROM, hard disk, and the like, and may or may not be included within the cloud environment. The storage 740 may store software modules or other instructions which can be executed by the processor 720 to perform the method 700 shown in FIG. 7. According to various embodiments, the storage 740 may store database files and may have a partitioning scheme as shown or described in the examples herein. The storage may include a data store having a plurality of tables, partitions and sub-partitions.

According to various embodiments, the network interface 710 may receive a communication request from a sending device which includes one or more of a process identifier and an action identifier. The processor 720 may identify a communication process associated with the communication request based on the process identifier and an action of the communication process based on the action identifier. For example, the action may be a step within a sequence of steps of the communication process. The processor 720 may also identify one or more currently available actions of the communication process based on status information associated with the sending device. For example, the status information may be stored in a status database, table, data structure, and the like. The processor 720 may dynamically determine whether the identified action is allowed based on the one or more currently available actions.

For example, in response to determining the action is allowed, the processor 720 may control the network interface 710 to transmit the received communication request to a receiving device. As another example, in response to determining that the action is not allowed, the processor 720 may output a notification to the sending device indicating the communication request is not allowed.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a network interface configured to receive a communication request from a sending device which comprises a process identifier and an action identifier; and
    a hardware processor configured to identify a communication process comprising a sequence of steps based on the process identifier and a step within the sequence of steps of the communication process based on the action identifier, identify completed steps in the sequence of steps of the communication process that have been completed based on status information associated with the sending device, and dynamically determine whether the identified step is allowed based on the identified completed steps, wherein, in response to determining the is identified step is allowed, the hardware processor is further configured to control the network interface to transmit the received communication request to a receiving device.

2. The computing system of claim 1, wherein, in response to determining that the identified step is not allowed, the hardware processor is further configured to output a notification to the sending device indicating the communication request is not allowed.

3. The computing system of claim 1, wherein the communication process comprises a sequence of steps associated with a document being sent from the sending device to the receiving device, via a process manager, and the sequence of steps associated with the document can by modified via the process manager.

4. The computing system of claim 1, wherein the process identifier comprises one or more of a process name and a process version which are included in a header of the communication request received from the sending device.

5. The computing system of claim 1, wherein the hardware processor is configured to identify the steps that have been completed based on respective status flags assigned to the sequence of steps included in the communication process.

6. The computing system of claim 1, wherein the communication request comprises an electronic document to be transmitted to the receiving device, and the hardware processor determines whether a current status of the communication process allows transmission of the electronic document.

7. The computing system of claim 1, wherein the communication request further comprises a sender identifier, and the hardware processor identifies a next step in the communication process via a retrieval of a current status of the communication process based on the sender identifier.

8. The computing system of claim 7, wherein the current status associated with the sender identifier is identified and stored by a monitoring system.

9. A method comprising:
receiving a communication request from a sending device, the communication request comprising a process identifier and an action identifier;
identifying a communication process comprising a sequence of steps based on the process identifier and a step within the sequence of steps of the communication process based on the action identifier;
identifying completed steps in the sequence of steps of the communication process that have been completed based on status information associated with the sending device;
dynamically determining whether the identified step is allowed based on the identified completed steps; and
in response to determining the identified step is allowed, transmitting the received communication request to a receiving device.

10. The method of claim 9, further comprising, in response to determining that the identified step is not allowed, outputting a notification to the sending device indicating the communication request is not allowed.

11. The method of claim 9, wherein the communication process comprises a sequence of steps associated with a document being sent from the sending device to the receiving device, via a process manager, and the sequence of steps associated with the document can by modified via the process manager.

12. The method of claim 9, wherein the process identifier comprises one or more of a process name and a process version which are included in a header of the communication request received from the sending device.

13. The method of claim 9, wherein the identifying the completed steps comprises identifying the completed steps based on status flags assigned to the sequence of steps included in the communication process.

14. The method of claim 9, wherein the communication request comprises an electronic document to be transmitted to the receiving device, and the determining comprises determining whether a current status of the communication process allows transmission of the electronic document.

15. The method of claim 9, wherein the communication request further comprises a sender identifier, and the identifying the completed steps of the communication process comprises retrieving a current status of the communication process based on the sender identifier.

16. The method of claim 15, wherein the current status associated with the sender identifier is identified and stored by a monitoring system.

17. A non-transitory computer readable storage medium comprising program instructions that when executed cause a computer to perform a method comprising:
receiving a communication request from a sending device, the communication request comprising a process identifier and an action identifier;
identifying a communication process comprising a sequence of steps based on the process identifier and a step within the sequence of steps of the communication process based on the action identifier;
identifying completed steps in the sequence of steps of the communication process that have been completed based on status information associated with the sending device;
dynamically determining whether the identified step is allowed based on the identified completed steps; and
in response to determining the identified step is allowed, transmitting the received communication request to a receiving device.

18. The non-transitory computer readable medium of claim 17, wherein the method further comprises, in response to determining that the identified step is not allowed, outputting a notification to the sending device indicating the communication request is not allowed.

19. The non-transitory computer readable medium of claim 17, wherein the communication process comprises a sequence of steps associated with a document being sent from the sending device to the receiving device, via a process manager, and the sequence of steps associated with the document can by modified via the process manager.

20. The non-transitory computer readable medium of claim 17, wherein the communication request comprises an electronic document to be transmitted to the receiving device, and the determining comprises determining whether a current status of the communication process allows transmission of the electronic document.

* * * * *